(12) United States Patent
Wada

(10) Patent No.: US 12,304,520 B2
(45) Date of Patent: May 20, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Koichiro Wada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 17/679,240

(22) Filed: Feb. 24, 2022

(65) Prior Publication Data

US 2022/0315039 A1 Oct. 6, 2022

(30) Foreign Application Priority Data

Mar. 30, 2021 (JP) ................................. 2021-057523

(51) Int. Cl.
*B60W 60/00* (2020.01)
*G01C 21/00* (2006.01)

(52) U.S. Cl.
CPC ......... *B60W 60/001* (2020.02); *G01C 21/387* (2020.08); *G01C 21/3896* (2020.08);
(Continued)

(58) Field of Classification Search
CPC ........... B60W 60/001; B60W 2420/42; B60W 2554/4041; B60W 2554/4049;
(Continued)

(56) References Cited

U.S. PATENT DOCUMENTS

2014/0156182 A1* 6/2014 Nemec ................ G08G 1/16
701/461
2016/0272203 A1* 9/2016 Otake ............ B60W 30/18154
(Continued)

FOREIGN PATENT DOCUMENTS

| JP | 2010-069921 | 4/2010 |
|----|-------------|--------|
| JP | 2019-053596 | 4/2019 |
| JP | 2019-207190 | 12/2019 |

OTHER PUBLICATIONS

Japanese Notice of Allowance for Patent Application No. 2021-057523 mailed Dec. 6, 2022.

*Primary Examiner* — Faris S Almatrahi
*Assistant Examiner* — Dana F Artimez
(74) *Attorney, Agent, or Firm* — Amin, Turocy & Watson, LLP

(57) ABSTRACT

A vehicle control device controls automated driving of a vehicle and includes a processor configured to execute a program to acquire map information including information of lanes and reference information for identifying a position of the vehicle, determine a travel lane in which the vehicle is traveling in the map information based on the acquired reference information; determine lane candidates in which the vehicle is traveling in the map information based on the reference information when the travel lane has not been identified, and maintain a current control level of the automated driving when an event in which the control level needs to be changed does not occur in any one of the lane candidates and lower the control level when the event occurs in at least one of the lane candidates.

9 Claims, 10 Drawing Sheets

(52) U.S. Cl.
CPC .............. *B60W 2420/403* (2013.01); *B60W 2554/4041* (2020.02); *B60W 2554/4049* (2020.02)

(58) Field of Classification Search
CPC ......... B60W 60/0053; B60W 2556/40; B60W 2556/50; B60W 60/0055; B60W 40/06; G01C 21/387; G01C 21/3896; G01C 21/3819; G01C 21/30
See application file for complete search history.

(56) References Cited

U.S. PATENT DOCUMENTS

| | | | |
|---|---|---|---|
| 2018/0237019 A1* | 8/2018 | Goto | G01C 21/3658 |
| 2019/0077402 A1 | 3/2019 | Kim et al. | |
| 2020/0173793 A1* | 6/2020 | Koshiba | G09B 29/10 |
| 2021/0370936 A1* | 12/2021 | Bhatnagar | B60W 30/16 |
| 2021/0409897 A1* | 12/2021 | Liu | G01S 13/931 |
| 2022/0178703 A1* | 6/2022 | Hiroyuki | G01C 21/32 |

* cited by examiner

FIG. 2

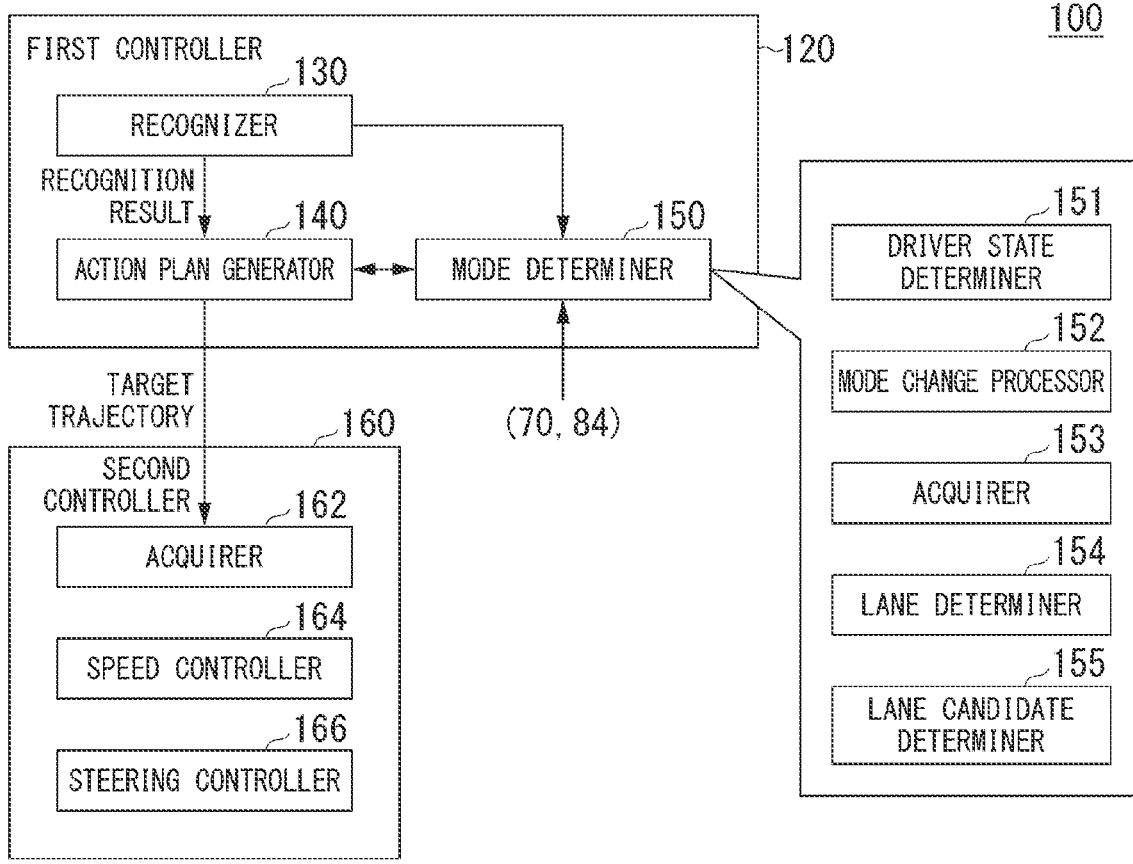

FIG. 3

| DRIVING MODE | CONTROL STATE | TASK | |
|---|---|---|---|
| MODE A | AUTOMATED DRIVING | FORWARD MONITORING: UNNECESSARY<br>STEERING WHEEL GRASP: UNNECESSARY | ▲ TASK: LIGHT |
| MODE B | DRIVING SUPPORT | FORWARD MONITORING: NECESSARY<br>STEERING WHEEL GRASP: UNNECESSARY | |
| MODE C | DRIVING SUPPORT | FORWARD MONITORING: NECESSARY<br>STEERING WHEEL GRASP: NECESSARY | |
| MODE D | DRIVING SUPPORT | FORWARD MONITORING: NECESSARY<br>AT LEAST SOME DRIVING OPERATION IS NECESSARY | |
| MODE E | MANUAL DRIVING | FORWARD MONITORING: NECESSARY<br>DRIVING OPERATION IS NECESSARY IN BOTH STEERING AND ACCELERATION | ▼ TASK: HEAVY |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-057523, filed Mar. 30, 2021, the content of which is incorporated herein by reference.

BACKGROUND OF THE INVENTION

Field of the Invention

The present invention relates to a vehicle control device, a vehicle control method, and a storage medium.

Description of Related Art

In the related art, a technique of estimating a position of a host vehicle on a map using image information acquired from an onboard camera, positioning information acquired from a satellite positioning system, or the like for the purpose of automated driving of a vehicle is known (for example, see Japanese Unexamined Patent Application, First Publication No. 2019-207190).

SUMMARY OF THE INVENTION

The technique in the related art is designed to stop automated driving or to decrease a control level of automated driving, for example, when the position of the host vehicle cannot be accurately estimated due to deterioration in a radio wave environment or the like. Accordingly, even in a situation in which maintenance of automated driving is likely to actually cause no problem, automated driving is immediately stopped or the like, an unnecessary driving load is imposed on an occupant, and thus convenience may be decreased.

The present invention was made in consideration of the aforementioned circumstances, and an objective thereof is to provide a vehicle control device, a vehicle control method, and a storage medium that can change the control level of automated driving according to appropriate conditions.

A vehicle control device, a vehicle control method, and a storage medium according to the present invention employ the following configurations.

(1) According to an aspect of the present invention, there is provided a vehicle control device that controls automated driving of a vehicle, the vehicle control device including a processor configured to execute a program to acquire map information including information of lanes and reference information for identifying the position of the vehicle; determining a travel lane in which the vehicle is traveling in the map information based on the acquired reference information, determine lane candidates in which the vehicle is traveling in the map information based on the reference information when the travel lane has not been identified, and maintain a current control level of the automated driving when an event in which the control level needs to be changed does not occur in any one of the lane candidates and lower the control level when the event occurs in at least one of the lane candidates.

(2) In the vehicle control device according to the aspect of (1), the reference information may be positioning information of the vehicle based on radio waves transmitted from artificial satellites.

(3) In the vehicle control device according to the aspect of (1) or (2), the processor may execute the program to lower the control level when the event occurs in at least one lane of the lane candidates or when the event occurs in another lane connected to the at least one lane of the lane candidates.

(4) In the vehicle control device according to the aspect of any one of (1) to (3), the processor may execute the program to determine whether the event occurs based on the map information.

(5) In the vehicle control device according to the aspect of any one of (1) to (4), the processor may execute the program to maintain the current control level when a distance between a current position of the vehicle in the lane candidates and an occurrence position of the event is equal to or greater than a predetermined value.

(6) In the vehicle control device according to the aspect of any one of (1) to (5), the processor may execute the program to cause an output device to output information for requesting a driving operation for an occupant of the vehicle when the control level is lowered.

(7) In the vehicle control device according to the aspect of any one of (1) to (6), the processor may execute the program to identify the lane candidates out of a plurality of lanes in which the vehicle is likely to be traveling based on at least one of surroundings image information acquired by imaging surroundings of the vehicle, positioning information of the vehicle based on radio waves transmitted from artificial satellites, and positioning information based on dead-reckoning navigation.

(8) In the vehicle control device according to the aspect of (7), the processor may execute the program to identify the lane candidates based on type information of road boundary lines included in the surroundings image information or information of objects enabling lane positions to be identified.

(9) In the vehicle control device according to the aspect of any one of (1) to (8), the processor may execute the program to stop the automated driving when the position of the vehicle identified by the reference information is not present in a lane or when the position of the vehicle identified by the reference information moves a predetermined distance or more within a unit time.

(10) According to another aspect of the present invention, there is provided a vehicle control method that is performed by a computer mounted in a vehicle to control automated driving of the vehicle, the vehicle control method including acquiring map information including information of lanes and reference information for identifying a position of the vehicle, determining a travel lane in which the vehicle is traveling in the map information based on the acquired reference information, determining lane candidates in which the vehicle is traveling in the map information based on the reference information when the travel lane has not been identified, and maintaining a current control level of the automated driving when an event in which the control level needs to be changed does not occur in any one of the lane candidates and lowering the control level when the event occurs in at least one of the lane candidates.

(11) According to another aspect of the present invention, there is provided a non-transitory computer-readable storage medium storing a program causing a computer, which is mounted in a vehicle to control automated driving of the vehicle, to perform acquiring map information including information of lanes and reference information for identifying a position of the vehicle, determining a travel lane in which the vehicle is traveling in the map information based on the acquired reference information, determining lane candidates in which the vehicle is traveling in the map information based on the reference information when the travel lane has not been identified, and maintaining a current control level of the automated driving when an event in which the control level needs to be changed does not occur in any one of the lane candidates and lowering the control level when the event occurs in at least one of the lane candidates.

According to the aspects of (1) to (11), lane candidates in which the vehicle is likely to be traveling in map information are determined, a current control level is maintained when an event in which the control level of automated driving needs to be changed does not occur in one of the lane candidates, and the control level is lowered when the event occurs in at least one of the lane candidates. Accordingly, it is possible to change the control level of automated driving according to appropriate conditions.

BRIEF DESCRIPTION OF THE DRAWINGS

FIG. 2 is a diagram showing functional configurations of a first controller and a second controller according to the embodiment.

FIG. 3 is a diagram showing an example of correspondence between driving modes and control states and tasks of a host vehicle according to the embodiment.

DETAILED DESCRIPTION OF THE INVENTION

Figure 1:
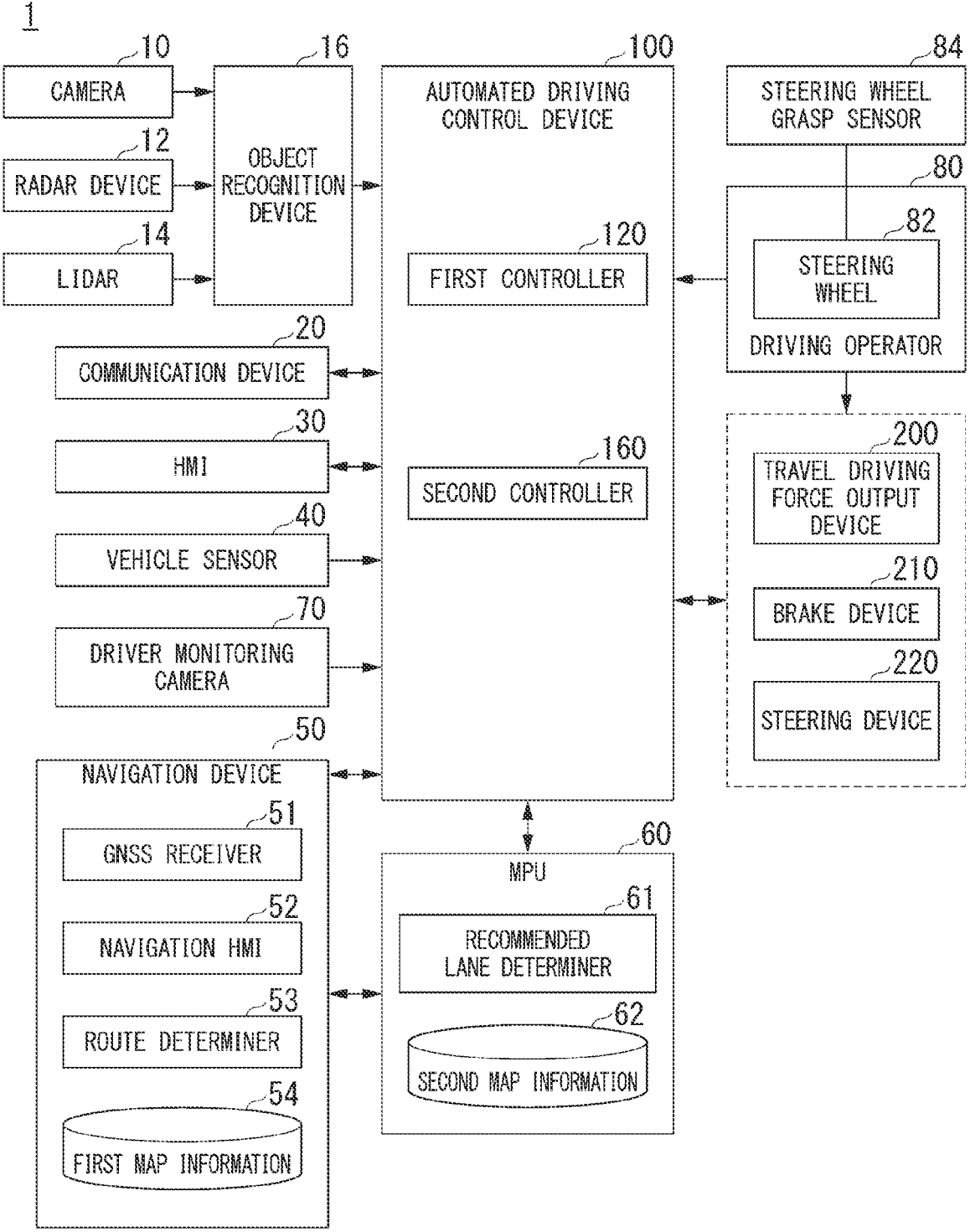
FIG. 1 is a diagram showing a configuration of a vehicle system employing a vehicle control device according to an embodiment.

Hereinafter, a vehicle control device, a vehicle control method, and a storage medium according to an embodiment of the present invention will be described with reference to the accompanying drawings.
[Overall Configuration]
FIG. 1 is a diagram showing a configuration of a vehicle system 1 employing a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel battery.

The vehicle system 1 includes, for example, a camera 10, a radar device 12, a Light Detection and Ranging (LIDAR) 14, an object recognition device 16, a communication device 20, a human-machine interface (HMI) 30, a vehicle sensor 40, a navigation device 50, a map positioning unit (MPU) 60, a driver monitoring camera 70, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration shown in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle in which the vehicle system 1 is mounted (hereinafter, referred to as a host vehicle M). When the front view of the host vehicle M is imaged, the camera 10 is attached to an upper part of a front windshield, a rear surface of a rearview mirror, or the like. The camera 10 images the surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. The radar device 12 is attached to an arbitrary position on the host vehicle M. The radar device 12 may detect a position and a speed of an object using a frequency modulated continuous wave (FM-CW) method.

The LIDAR 14 radiates light (or electromagnetic waves of wavelengths close to light) to the surroundings of the host vehicle M and measures scattered light. The LIDAR 14 detects a distance to an object on the basis of a time from radiation of light to reception of light. The radiated light is, for example, a pulse-like laser beam. The LIDAR 14 is attached to an arbitrary position on the host vehicle M.

The object recognition device 16 performs a sensor fusion process on results of detection from some or all of the camera 10, the radar device 12, and the LIDAR 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR 14 to the automated driving control device 100 without any change. The object recognition device 16 may be omitted from the vehicle system 1.

The communication device 20 communicates with other vehicles near the host vehicle M, for example, using a cellular network, a Wi-Fi network, Bluetooth (registered trademark), or dedicated short range communication (DSRC) or communicates with various server devices via a radio base station.

The HMI 30 presents various types of information to an occupant of the host vehicle M and receives an input operation from the occupant. The HMI 30 includes various display devices, speakers, buzzers, touch panels, switches, and keys. The HMI 30 is an example of an "output device."

The vehicle sensor 40 includes a vehicle speed sensor that detects a speed of the host vehicle M, an acceleration sensor that detects an acceleration, and a direction sensor that detects a direction of the host vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory.

The GNSS receiver 51 identifies a position of the host vehicle M on the basis of signals received from GNSS satellites (radio waves received from artificial satellites). The position of the host vehicle M may be identified or corrected by an inertial navigation system (INS) using the output of the vehicle sensor 40. The navigation HMI 52 includes a display device, a speaker, a touch panel, and keys. A whole or a part of the navigation HMI 52 may be shared by the HMI 30. For example, the route determiner 53 determines a route (hereinafter, referred to as a route on a map) from the position of the host vehicle M identified by the GNSS receiver 51 (or an input arbitrary position) to a destination input by an occupant using the navigation HMI 52 with reference to the first map information 54.

The first map information 54 is, for example, information in which a road shape is expressed by links indicating a road and nodes connected by the links. The first map information 54 may include a curvature of a road or point of interest (POI) information. The route on a map is output to the MPU 60. The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 is realized by causing a hardware processor (a computer) such as a central processing unit (CPU) to execute a program (software). The recommended lane determiner 61 may be realized by hardware (which includes circuitry) such as a large-scale integration (LSI), an application specific integrated circuit (ASIC), a field-programmable gate array (FPGA), or a graphics processing unit (GPU) or may be realized by cooperation of software and hardware. The program may be stored in a storage device (a storage device including a non-transitory storage medium) of the MPU 60 in advance, or may be stored in a removable storage medium such as a DVD or a CD-ROM and installed in the storage device of the MPU 60 by setting the removable storage medium (non-transitory storage medium) to a drive device.

The recommended lane determiner 61 divides a route on a map supplied from the navigation device 50 into a plurality of blocks (for example, every 100 [m] in a vehicle travel direction) and determines a recommended lane for each block with reference to the second map information 62. The recommended lane determiner 61 determines in which lane from the leftmost the host vehicle is to travel. When there is a branching point in the route on a map, the recommended lane determiner 61 determines a recommended lane such that the host vehicle M travels along a rational route for traveling to a branching destination.

The second map information 62 is map information with higher precision than the first map information 54. The second map information 62 includes, for example, information on the centers of lanes (road center lines, center lines) or information on boundaries of lanes (road boundary lines, boundary lines). The second map information 62 may include road information, traffic regulation information, address information (addresses and postal codes), facility information, phone number information, information on a prohibited section in which mode A or mode B which will be described later is prohibited, and information about whether a level-down event which will be described later occurs. The second map information 62 may be updated from time to time by causing the communication device 20 to communicate with another device.

The driver monitoring camera 70 is, for example, a digital camera using a solid-state imaging device such as a CCD or a CMOS. The driver monitoring camera 70 is attached to an arbitrary position on the host vehicle M in a place and direction in which the head of an occupant (hereinafter referred to as a driver) sitting on a driver's seat can be imaged from the front (such that the face of the driver is imaged). For example, the driver monitoring camera 70 is attached to an upper part of a display device which is provided at the central part of an instrument panel of the host vehicle M.

The driving operator 80 includes, for example, an accelerator pedal, a brake pedal, a shift lever, and other operators in addition to a steering wheel 82. A sensor that detects an amount of operation or performing of an operation is attached to the driving operator 80. Results of detection of the sensor are output to the automated driving control device 100 or output to some or all of the travel driving force output device 200, the brake device 210, and the steering device 220. The steering wheel 82 does not have a ring shape and may have a shape such as a deformed steering, a joystick, or a button. A steering wheel grasp sensor 84 is attached to the steering wheel 82. The steering wheel grasp sensor 84 is realized by a capacitance sensor or the like and outputs a signal indicating whether a driver grasps the steering wheel 82 (which means contacting the steering wheel with a force applied thereto) to the automated driving control device 100.

The automated driving control device 100 includes, for example, a first controller 120 and a second controller 160. The first controller 120 and the second controller 160 are realized, for example, by causing a hardware processor such as a CPU to execute a program (software). Some or all of such elements may be realized by hardware (which includes circuitry) such as an LSI, an ASIC, or an FPGA, or a GPU or may be realized in cooperation of software and hardware. The program may be stored in a storage device such as an HDD or a flash memory of the automated driving control device 100 in advance, or may be stored in a removable storage medium such as a DVD or a CD-ROM and installed in the HDD or the flash memory of the automated driving control device 100 by setting the removable storage medium (non-transitory storage medium) to a drive device.

FIG. 2 is a diagram showing functional configurations of the first controller 120 and the second controller 160. The first controller 120 includes, for example, a recognizer 130, an action plan generator 140, and a mode determiner 150. The automated driving control device 100 is an example of a "vehicle control device."

For example, the first controller 120 realizes a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched), scoring both recognitions, and comprehensively evaluating the recognitions. Accordingly, reliability of automated driving is secured.

The recognizer 130 recognizes states such as a position, a speed, and an acceleration of an object near the host vehicle M on the basis of information input from the camera 10, the radar device 12, and the LIDAR 14 via the object recognition device 16. For example, a position of an object is recognized as a position in an absolute coordinate system with an origin set to a representative point of the host vehicle M (such as the center of gravity or the center of a drive shaft) and is used for control. The position of an object may be expressed as a representative point such as the center of gravity or a corner of the object or may be expressed as an area. The "state" of an object may include an acceleration or a jerk of the object or a "moving state" (for example, whether lane change is being performed or whether lane change is going to be performed) thereof.

The recognizer 130 recognizes, for example, a lane (a travel lane) in which the host vehicle M is traveling. For example, the recognizer 130 recognizes the travel lane by comparing a pattern of lane boundary lines near the host vehicle M which are recognized from an image captured by the camera 10 with a pattern of lane boundary lines (for example, arrangement of a solid line and a dotted line) which are acquired from the second map information 62. The recognizer 130 is not limited to the lane boundary lines, but may recognize the travel lane by recognizing travel road boundaries (road boundaries) including lane boundary lines, edges of roadsides, curbstones, median strips, and guard rails. In this recognition, the position of the host vehicle M acquired from the navigation device 50 and the result of processing from the INS may be considered. The recognizer 130 recognizes a stop line, an obstacle, a red signal, a toll gate, or other road events.

The recognizer 130 recognizes a position or a direction of the host vehicle M with respect to a travel lane at the time of recognition of the travel lane. The recognizer 130 may recognize, for example, a separation of a reference point of the host vehicle M from the lane center and an angle of the travel direction of the host vehicle M with respect to a line formed by connecting the lane centers in the travel direction of the host vehicle M as the position and the posture of the host vehicle M relative to the travel lane. Instead, the recognizer 130 may recognize the position of a reference point of the host vehicle M relative to one side line of the travel lane (a lane boundary line or a road boundary) or the like as the position of the host vehicle M relative to the travel lane.

The action plan generator 140 creates a target trajectory in which the host vehicle M will travel autonomously (without requiring a driver's operation) in the future such that the host vehicle M can travel in a recommended lane determined by the recommended lane determiner 61 in principle and copes with surrounding circumstances of the host vehicle M. A target trajectory includes, for example, a speed element. For example, a target trajectory is expressed by sequentially arranging points (trajectory points) at which the host vehicle M is to arrive. Trajectory points are points at which the host vehicle M is to arrive at intervals of a predetermined traveling distance (for example, about several [m]) along a road, and a target speed and a target acceleration at intervals of a predetermined sampling time (for example, about below the decimal point [sec]) are created as a part of the target trajectory in addition. Trajectory points may be positions at which the host vehicle M is to arrive at sampling times every predetermined sampling time. In this case, information of a target speed or a target acceleration is expressed by intervals between the trajectory points.

The action plan generator 140 may set events of automated driving in creating a target trajectory. The events of automated driving include a constant-speed travel event, a low-speed following travel event, a lane change event, a branching event, a merging event, and an overtaking event. The action plan generator 140 creates a target trajectory based on events which are started.

The mode determiner 150 determines one of a plurality of driving modes with different tasks to be imposed on a driver as a driving mode of the host vehicle M. The mode determiner 150 includes, for example, a driver state determiner 151, a mode change processor 152, an acquirer 153, a lane determiner 154, and a lane candidate determiner 155. These individual functions will be described later. The mode change processor 152 is an example of a "change processing unit." The acquirer 153 is an example of an "acquirer." The lane determiner 154 is an example of a "lane determiner." The lane candidate determiner 155 is an example of a "lane candidate determiner."

FIG. 3 is a diagram showing an example of correspondence between driving modes and control states of the host vehicle M and tasks. A driving mode of the host vehicle M includes, for example, five modes including mode A to mode E. A control state, that is, an automation level (a control level) of driving control of the host vehicle M, is the highest in mode A, decreases in the order of mode B, mode C, and mode D, and is the lowest in mode E. On the other hand, a task to be imposed on a driver is the lightest in mode A, becomes heavier in the order of mode B, mode C, and mode D, and is the heaviest in mode E. In mode D and mode E, since the control state is not automated driving, the automated driving control device 100 has to end control associated with automated driving and take charge of transitioning to driving support or manual driving. Exemplary examples of the details of the driving modes will be provided below.

In mode A, the control state is an automated driving state and none of forward monitoring and grasping of the steering wheel 82 (steering grasp in the drawing) is imposed on a driver. Even in mode A, the driver is requested to take a posture that can rapidly transition to manual driving in response to a request from a system centered on the automated driving control device 100. Automated driving mentioned herein means that both steering and acceleration/deceleration are controlled without requiring a driver's operation. Forward means a space in the travel direction of the host vehicle M which is seen via a front windshield. For example, mode A is a driving mode which is executable when conditions in which the host vehicle M is traveling at a predetermined speed (for example, about 50 [km/h]) on a motorway such as a highway and a preceding vehicle to be followed is present are satisfied, and is also referred to as traffic jam pilot (TJP). When the conditions are not satisfied, the mode determiner 150 changes the driving mode of the host vehicle M to mode B.

In mode B, the control state is a driving support state, a task for monitoring a space in front of the host vehicle M (hereinafter referred to as forward monitoring) is imposed on a driver, and a task for grasping the steering wheel 82 is not imposed on the driver. In mode C, the control state is a driving support state, the task for forward monitoring and the task for grasping the steering wheel 82 are imposed on a driver. Mode D is a driving mode in which a driver's driving operation to a certain extent is required for at least one of steering and acceleration/deceleration of the host vehicle M. For example, in mode D, driving support such as adaptive cruise control (ACC) or lane keeping assist system (LKAS) is performed. In mode E, the control state is a manual driving state in which a driver's driving operation is required for both steering and acceleration/deceleration. In both mode D and mode E, the task for monitoring the space in front of the host vehicle M is imposed on a driver.

The automated driving control device 100 (and a driving support device (not shown)) performs automatic lane change corresponding to a driving mode. Automatic lane change includes automatic lane change (1) based on a system request and automatic lane change (2) based on a driver request. Automatic lane change (1) includes automatic lane change for overtaking which is performed when a speed of a preceding vehicle is lower by a reference or more than the speed of the host vehicle and automatic lane change for traveling to a destination (automatic lane change due to change of a recommended lane). Automatic lane change (2) is automatic lane change for changing the travel lane of the host vehicle M in an indicated direction when conditions associated with a speed or the positional relationship with nearby vehicles, or the like are satisfied and the direction indicator is operated by a driver.

The automated driving control device 100 does not perform any of automatic lane change (1) and automatic lane change (2) in mode A. The automated driving control device 100 performs both automatic lane change (1) and automatic lane change (2) in mode B and mode C. The driving support device (not shown) does not perform automatic lane change (1) but performs automatic lane change (2) in mode D. In mode E, none of automatic lane change (1) and automatic lane change (2) is performed.

The mode determiner 150 changes the driving mode of the host vehicle M to a driving mode with a heavier task when a task associated with the determined driving mode (hereinafter referred to as a current driving mode) is not performed by a driver.

For example, in mode A, when a driver takes a posture with which the driver cannot transition to manual driving in response to a request from a system (for example, when the driver is looking off a permitted area or when a sign for making driving difficult is detected), the mode determiner 150 performs control such that the driver is urged to transition to manual driving using the HMI 30, and the host vehicle M is put on a road edge and slowly stopped and automated driving is stopped when the driver does not respond. After automated driving has been stopped, the host vehicle is in mode D or E and the host vehicle M can be started by the driver's manual operation. This is the same for "stopping of automated driving." When a driver does not monitor a space in front of the host vehicle in mode B, the mode determiner 150 performs control such that the driver is urged to perform forward monitoring using the HMI 30, and the host vehicle M is put on a road edge and slowly stopped and automated driving is stopped when the driver does not respond. In mode C, when a driver does not perform forward monitoring or when a driver does not grasp the steering wheel 82, the mode determiner 150 performs control such that the driver is urged to perform forward monitoring or grasping of the steering wheel 82 using the HMI 30, and the host vehicle M is put on a road edge and slowly stopped and automated driving is stopped when the driver does not respond.

The driver state determiner 151 monitors a driver's state for the mode change and determines whether the driver's state is a state corresponding to a task. For example, the driver state determiner 151 performs a posture estimating process by analyzing an image captured by the driver monitoring camera 70 and determines whether the driver takes a posture with which the driver cannot transition to manual driving in response to a request from the system. The driver state determiner 151 performs a sightline estimating process by analyzing an image captured by the driver monitoring camera 70 and determines whether the driver is monitoring a space in front.

The mode change processor 152 performs various processes for mode change. For example, the mode change processor 152 instructs the action plan generator 140 to create a target trajectory for stopping on a road edge, instructs a driving support device (not shown) to operate, or controls the HMI 30 such that the driver is urged to perform an action. When a level-down event does not occur in any lane of lane candidates determined by the lane candidate determiner 155 which will be described later, the mode change processor 152 maintains the current control level of automated driving. On the other hand, when a level-down event occurs in at least one lane of the lane candidates determined by the lane candidate determiner 155, the mode change processor 152 lowers the control level of automated driving. That is, the mode change processor 152 maintains the control level of automated driving when an event in which the current control level of automated driving needs to be changed does not occur in any lane of the lane candidates and lowers the control level when such an event occurs in at least one lane of the lane candidates. Details of the process performed by the mode change processor 152 will be described later.

The acquirer 153 acquires position information of the host vehicle M (hereinafter referred to as "host vehicle position information") output from the GNSS receiver 51 and map information in which a recommended lane on a route to a destination of the host vehicle M is identified (hereinafter referred to as "recommended lane map information") and which is output from the MPU 60. The recommended lane map information is high-precision map information in which a recommended lane is identified on the second map information 62. That is, the acquirer 153 acquires map information including information of lanes and reference information for identifying a position of a vehicle. The reference information is positioning information of a vehicle based on radio waves transmitted from artificial satellites. The recommended lane map information is an example of "map information." The host vehicle position information is an example of "reference information."

The acquirer 153 acquires a surroundings image obtained by imaging the surroundings of the host vehicle M and output from the camera 10, position information of a nearby object output from the radar device 12, distance information to a nearby object output from the LIDAR 14, recognition information such as the position, the type, and the speed of a nearby object output from the object recognition device 16, and position information of the host vehicle M (hereinafter referred to as "odometry information") which is calculated using dead-reckoning navigation on the basis of an output value of the vehicle sensor 40. The odometry information is, for example, information of a travel distance per unit time of the host vehicle M which is obtained by integrating the speed of the host vehicle M which is an output of a wheel speed sensor included in the vehicle sensor 40. The odometry information may be information in which information of a turning angle which is an output of a yaw rate sensor included in the vehicle sensor 40 or the like is reflected.

The acquirer 153 acquires road information or the like from a navigation server which is output from the communication device 20. The road information includes vehicle speed information, road attribute information, and road traffic information. The vehicle speed information is information such as a speed limit (for example, a legal speed limit), an average speed, or a vehicle speed distribution in each section of a scheduled travel route. The average speed is an average value of speeds of a plurality of vehicles having traveled in each section. The road attribute information is information such as the road type (a highway or a regular road), the road gradient, or the number of lanes. The road traffic information is information such as congestion, signals, stops, or roadwork.

The lane determiner 154 determines a travel lane in which the host vehicle M is traveling on the recommended lane map information with reference to the host vehicle position information and the recommended lane map information acquired by the acquirer 153. For example, the lane determiner 154 identifies one travel lane in which the host vehicle M is traveling on the recommended lane map information. That is, the lane determiner 154 determines the travel lane in which the vehicle is traveling on the map information on the basis of the acquired reference information. Details of the process which is performed by the lane determiner 154 will be described later.

When the travel lane of the host vehicle M is not identified by the lane determiner 154, the lane candidate determiner 155 determines a candidate for the lane (hereinafter referred to as a "lane candidate") in which the host vehicle M is traveling. For example, the lane candidate determiner 155 identifies a plurality of lane candidates on the basis of at least one of the recommended lane map information, the host vehicle position information, the surroundings image, position information of a nearby object, distance information to a nearby object, recognition information of a nearby object, the odometry information, and the road information which are acquired by the acquirer 153. That is, when the travel lane is not identified by the lane determiner 154, the lane candidate determiner 155 determines lane candidates in which the vehicle is likely to be traveling on the map information on the basis of the reference information. The lane candidate determiner 155 identifies lane candidates out of a plurality of lanes in which the vehicle is likely to be traveling on the basis of at least one the surroundings image information obtained by imaging the surroundings of the vehicle, GNSS positioning information of the vehicle, and positioning information based on dead-reckoning navigation. Details of the process which is performed by the lane candidate determiner 155 will be described later.

Referring back to FIG. 2, the second controller 160 controls the travel driving force output device 200, the brake device 210, and the steering device 220 such that the host vehicle M travels along a target trajectory created by the action plan generator 140 as scheduled.

The second controller 160 includes, for example, an acquirer 162, a speed controller 164, and a steering controller 166. The acquirer 162 acquires information of a target trajectory (trajectory points) created by the action plan generator 140 and stores the acquired information in a memory (not shown). The speed controller 164 controls the travel driving force output device 200 or the brake device 210 on the basis of a speed element accessory to the target trajectory stored in the memory. The steering controller 166 controls the steering device 220 on the basis of a curve state of the target trajectory stored in the memory. The processes of the speed controller 164 and the steering controller 166 are realized, for example, in combination of feed-forward control and feedback control. For example, the steering controller 166 performs control by combining of feed-forward control based on a curvature of a road in front of the host vehicle M and feedback control based on a separation from the target trajectory.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

[Driving Mode Changing Process]

Figure 4:
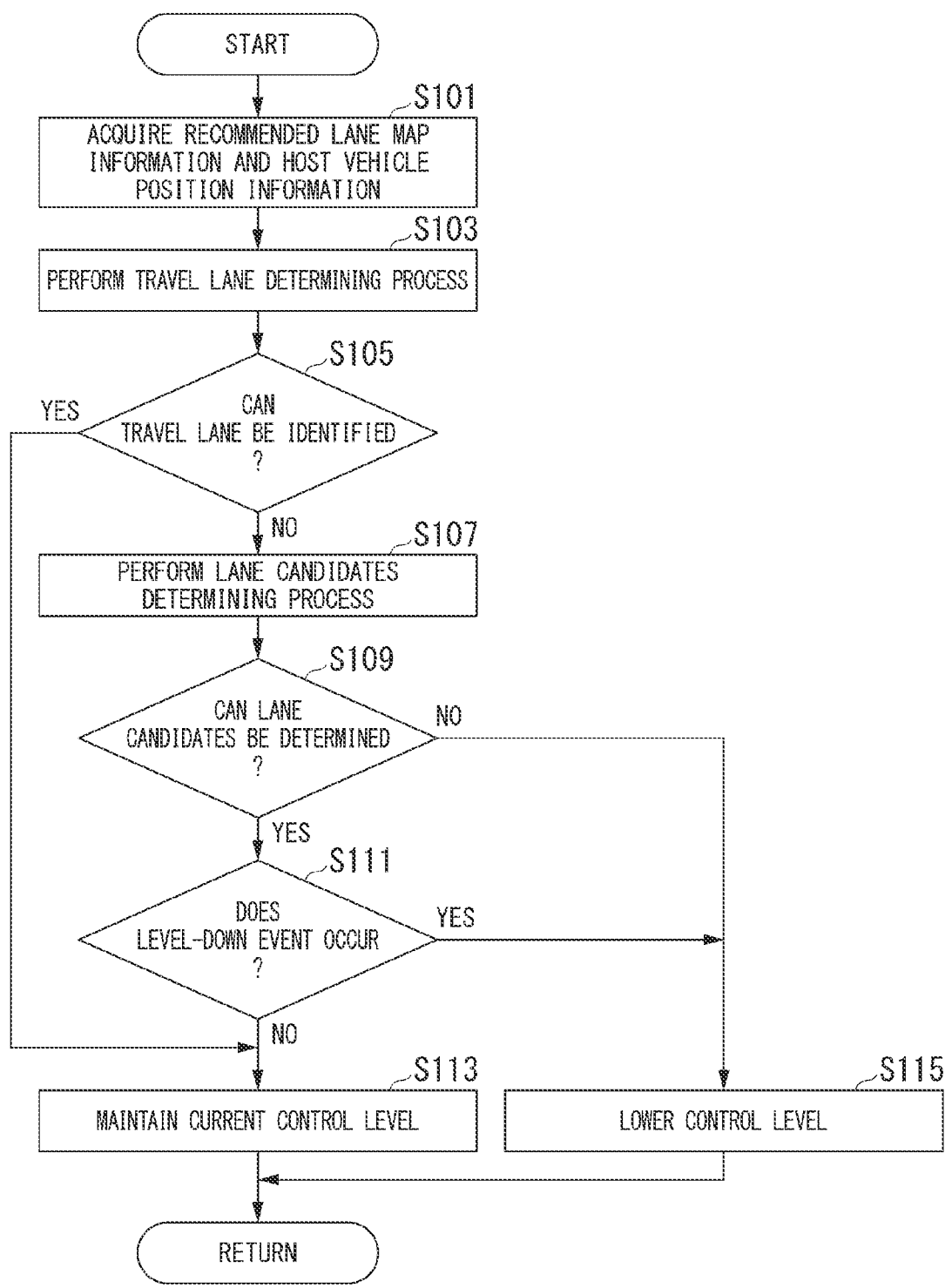
FIG. 4 is a flowchart showing an example of a driving mode changing process in automated driving which is performed by an automated driving control device according to the embodiment.

A driving mode changing process in automated driving will be described below with reference to the accompanying flowcharts. FIG. 4 is a flowchart showing an example of the driving mode changing process in automated driving which is performed by the automated driving control device 100 according to the embodiment. In the following description, it is assumed that the host vehicle M is traveling in a driving mode determined by the mode determiner 150 (for example, mode A or mode B) along the target trajectory created by the action plan generator 140 by automated driving control.

First, the acquirer 153 acquires recommended lane map information output from the MPU 60 and host vehicle position information output from the GNSS receiver 51 (Step S101).

Then, the lane determiner 154 performs a process of determining a travel lane in which the host vehicle M is traveling on the recommended lane map information with reference to the recommended lane map information and the host vehicle position information acquired by the acquirer 153 (Step S103).

Then, the lane determiner 154 determines whether one travel lane is able to be identified (Step S105). For example, when the position of the host vehicle M identified by the GNSS receiver 51 changes discretely with time, the lane determiner 154 determines that the travel lane of the host vehicle M is not able to be identified. The case in which the position of the host vehicle M changes discretely with time is, for example, a case in which the position of the host vehicle M is located in a first lane at a certain time and moves to a lane different from the first lane at a next time. A situation in which the travel lane is not able to be identified may occur, for example, when a receiving environment of signals from GNSS satellites deteriorates and GNSS positioning fluctuates or when signals from GNSS satellites are intermittently received. When one travel lane is not able to be identified on the basis of the recommended lane map information and the host vehicle position information, the lane determiner 154 may cause a display device included in the HMI 30 to display a screen for selecting a travel lane and identify the travel lane on the basis of an occupant's selection operation on the selection screen.

When the lane determiner 154 determines that a travel lane is able to be identified (Step S105: YES), a situation in which automated driving is able to be stably maintained is considered. In this case, the mode change processor 152 maintains the current control level and maintains the current driving mode (mode A or mode B herein) (Step S113).

On the other hand, when the lane determiner 154 determines that a travel lane is not able to be identified (Step S105: NO), a situation in which it is difficult to stably maintain automated driving is considered. In this case, the following additional determination process using lane candidates is performed. That is, the lane candidate determiner 155 performs a lane candidate determining process (Step S107). For example, the lane candidate determiner 155 performs the lane candidate determining process on the basis of at least one of the recommended lane map information, the host vehicle position information, the surroundings image, position information of a nearby object, distance information to a nearby object, recognition information of a nearby object, odometry information, and road information which are acquired by the acquirer 153.

One travel lane is not able to be identified using the host vehicle position information output from the GNSS receiver 51. That is, the position of the host vehicle M identified using the host vehicle position information changes, for example, discretely with time (as if the host vehicle M were located in a plurality of lanes). When the host vehicle position information is used, the lane candidate determiner 155 determines a plurality of travel lanes which can be identified using the host vehicle position information (a plurality of lanes in which the host vehicle M is likely to be traveling) as lane candidates.

When the surroundings image output from the camera 10 is used, the lane candidate determiner 155 determines a plurality of lanes appearing in the surroundings image as lane candidates. When the position information of a nearby object output from the radar device 12, the distance information of a nearby object output from the LIDAR 14, the recognition information of a nearby object output from the object recognition device 16, and the like are used, the lane candidate determiner 155 estimates lane candidates by combining this information of a nearby object and information of a nearby object included in the recommended lane map information. When the odometry information is used, the lane candidate determiner 155 estimates lane candidates by combining the position of the host vehicle M identified using the odometry information and the recommended lane map information. When the road information is used, the lane candidate determiner 155 determines lanes included in the road information as lane candidates.

Then, the lane candidate determiner 155 determines whether lane candidates are able to be identified (Step S109). When it is determined that lane candidates are able to be identified (Step S109: YES), the lane candidate determiner 155 determines whether a level-down event occurs in a section of a predetermined distance in front of the host vehicle M in the travel direction (Step S111).

A level-down event (a driving turnover event) is an event in which a driving mode needs to be changed from a driving mode with a light task to be imposed on a driver of the vehicle to a driving mode with a heavy task (an event in which the control level needs to be lowered). For example, a level-down event refers to an event in which the driving mode needs to be changed from mode A or B to mode C, D, or E. Examples of the level-down event include an event in which the vehicle travels in a branching lane, an event in which the vehicle travels in a lane connected to a branching lane (an event in which the vehicle travels in a lane from which the vehicle can move to the branching lane), an event in which the vehicle travels in a merging lane, an event in which the vehicle travels in a lane connected to a merging lane (an event in which the vehicle travels in a lane from which the vehicle can move to the merging lane or an event in which the vehicle travels in a lane to which the vehicle can move from the merging lane), an event in which the vehicle moves from an expressway to a regular road, an event in which the vehicle travels in a sharply curved lane, an event in which the vehicle travels to a road of which the number of lanes is less than that of a current travel road, and an event in which the vehicle travels in a roadwork section. Information of the level-down event is stored in the recommended lane map information in correlation with the lanes. Information on a decrease in the number of lanes or a roadwork section may be based on road traffic information which is acquired from a Vehicle Information and Communication System Center (VICS (registered trademark)) via the communication device 20. The level-down event is an example of an "event." That is, the level-down event is branching or merging of a lane.

Figure 5A:
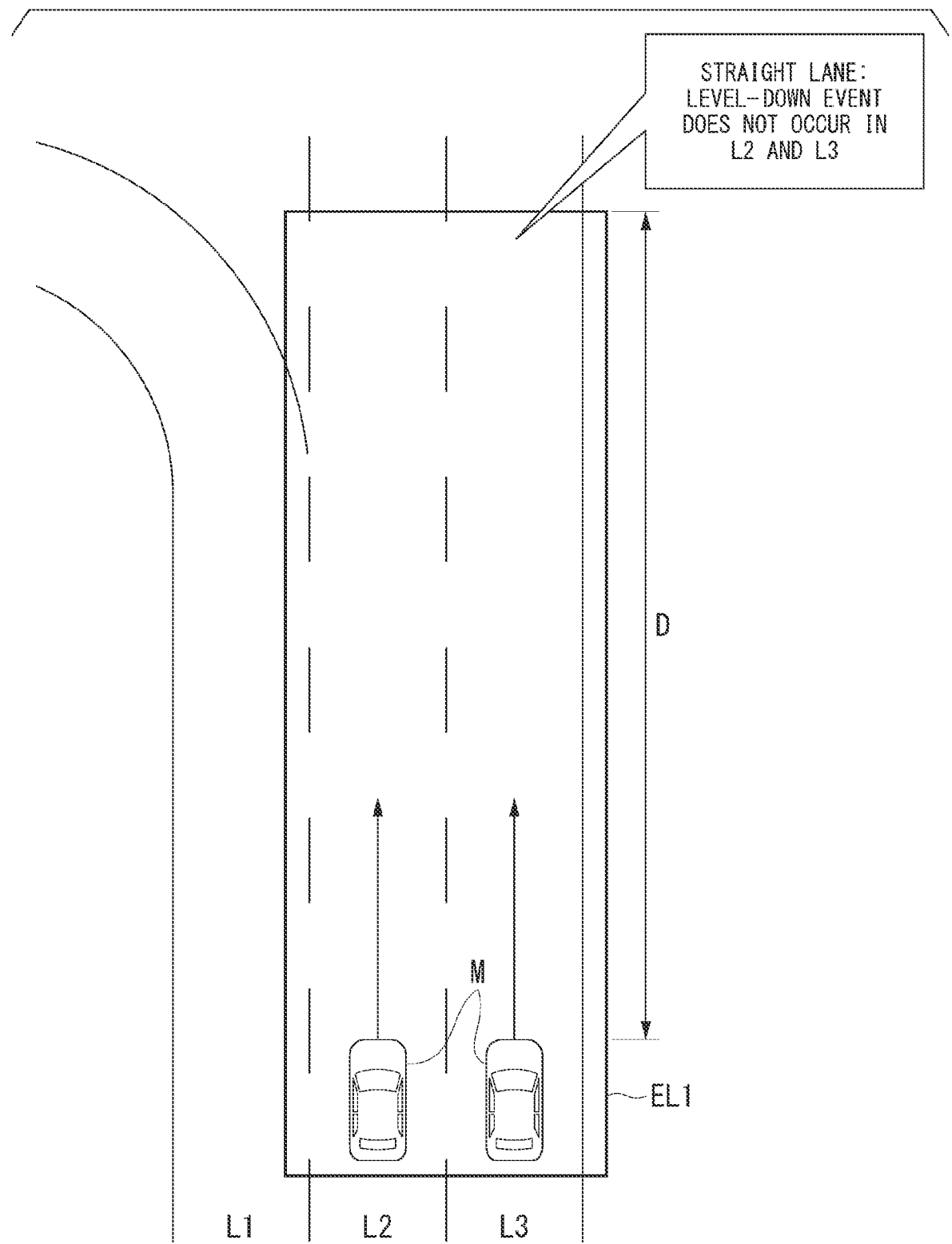
FIG. 5A is a diagram showing an example of a situation in which a level-down event does not occur in a lane candidate.
Figure 5B:
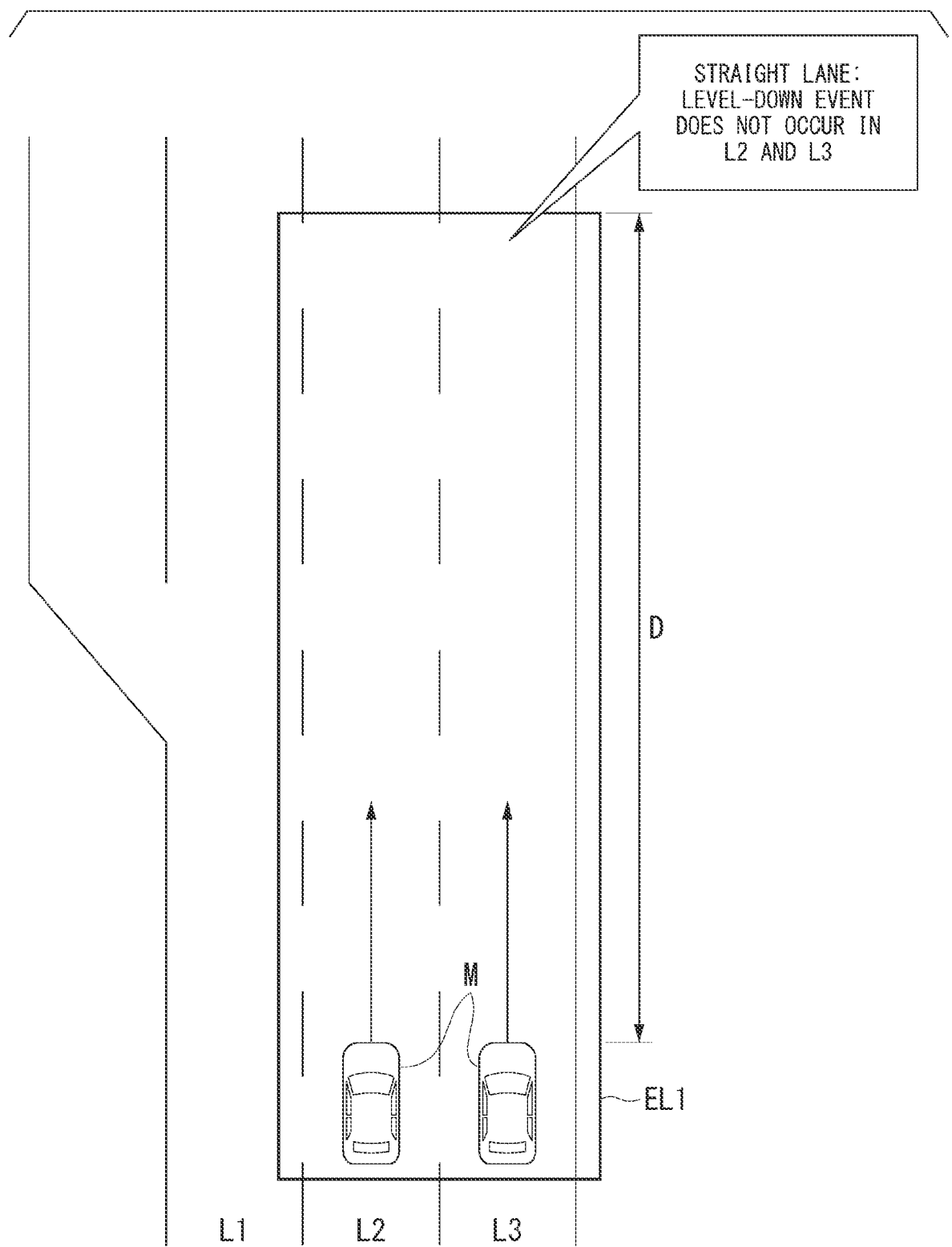
FIG. 5B is a diagram showing an example of a situation in which a level-down event does not occur in a lane candidate.

FIGS. 5A and 5B are diagrams showing examples of a situation in which a level-down event does not occur in a lane candidate. In the example shown in FIG. 5A, in Steps S107 and S109, two lanes including a second lane L2 and a third lane L3 out of three lanes (a first lane L1, a second lane L2, and a third lane L3) of a road on which the host vehicle M is traveling are identified as a lane candidate EL1 and the mode change processor 152 determines whether a level-down event occurs in a section of a predetermined distance D in front of the host vehicle M in the travel direction for each of the second lane L2 and the third lane L3. In this example, in the section of the predetermined distance D, both the second lane L2 and the third lane L3 are straight lanes and no level-down event occurs. In this case, the mode change processor 152 determines that no level-down event occurs for the lane candidate EL1.

In the example shown in FIG. 5B, in Steps S107 and S109, two lanes including a second lane L2 and a third lane L3 out of three lanes (a first lane L1, a second lane L2, and a third lane L3) of a road on which the host vehicle M is traveling are identified as a lane candidate EL1 and the mode change processor 152 determines whether a level-down event occurs in a section of a predetermined distance D in front of the host vehicle M in the travel direction for each of the second lane L2 and the third lane L3. In this example, in the section of the predetermined distance D, both the second lane L2 and the third lane L3 are straight lanes and no level-down event occurs. In this case, the mode change processor 152 determines that no level-down event occurs for the lane candidate EL1.

Figure 6A:
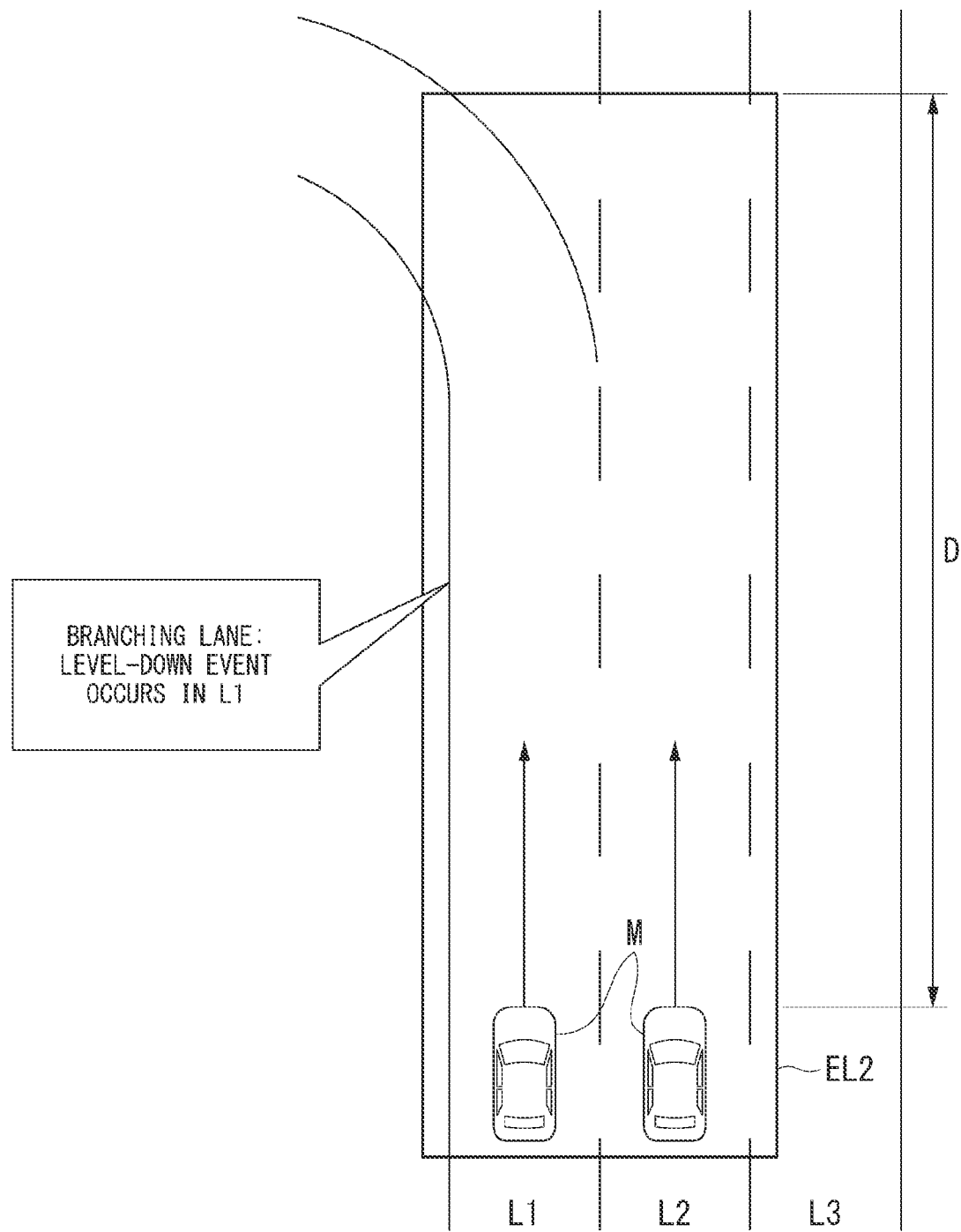
FIG. 6A is a diagram showing an example of a situation in which a level-down event occurs in a lane candidate.
Figure 6B:
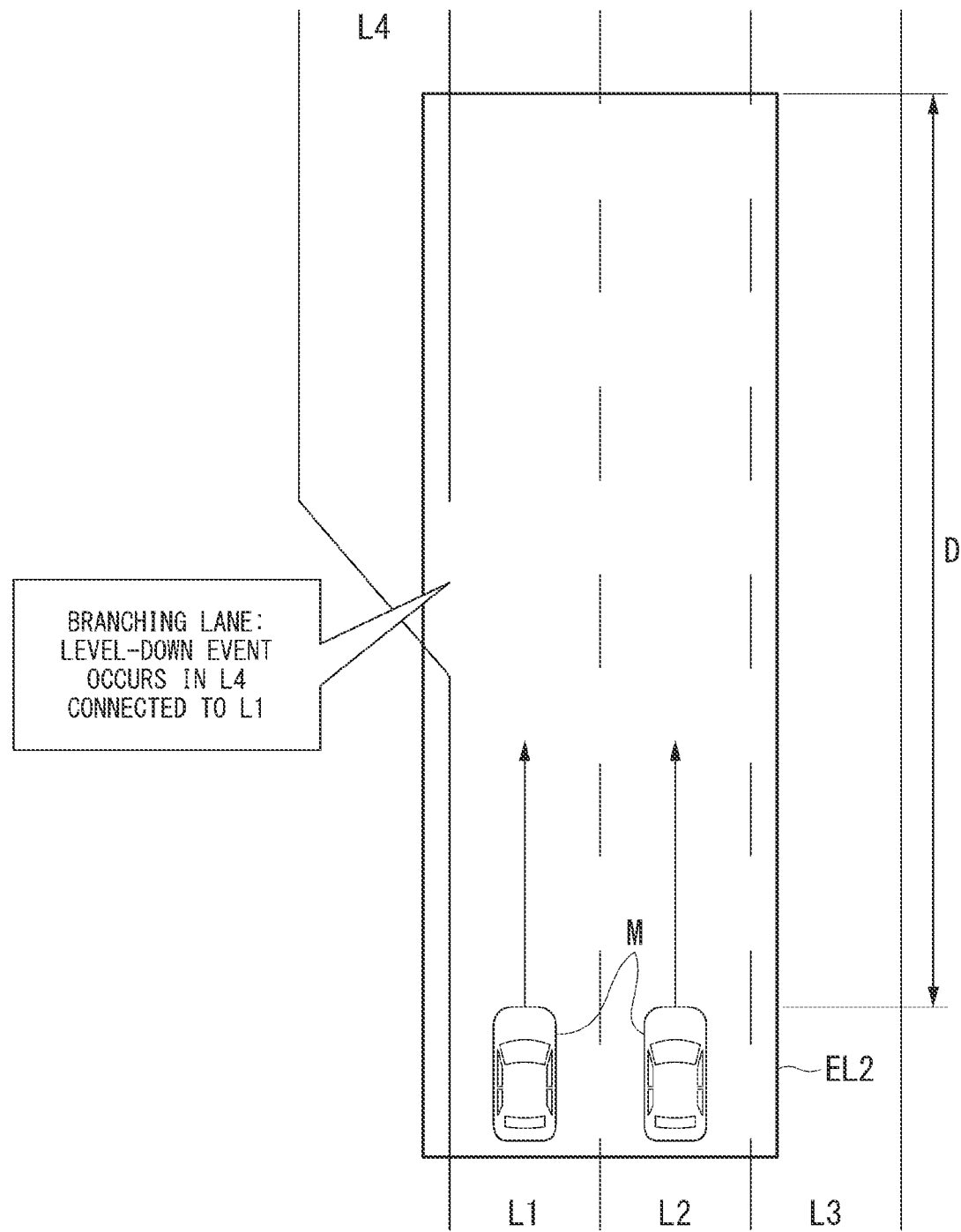
FIG. 6B is a diagram showing an example of a situation in which a level-down event occurs in a lane candidate.

FIGS. 6A and 6B are diagrams showing examples of a situation in which a level-down event occurs in a lane candidate. In the example shown in FIG. 6A, in Steps S107 and S109, two lanes including a first lane L1 and a second lane L2 out of three lanes (a first lane L1, a second lane L2, and a third lane L3) of a road on which the host vehicle M is traveling are identified as a lane candidate EL2, and the mode change processor 152 determines whether a level-down event occurs in a section of a predetermined distance D in front of the host vehicle M in the travel direction for each of the first lane L1 and the second lane L2. In this example, in the section of the predetermined distance D, the second lane L2 is a straight lane and no level-down event occurs. On the other hand, the first lane L1 is a branching lane which branches from the second lane L2 and the third lane L3 (a main lane) and a level-down event occurs. That is, in the section of the predetermined distance D, a level-down event occurs in the first lane L1. In this case, the mode change processor 152 determines that a level-down event occurs for the lane candidate EL2.

In the example shown in FIG. 6B, in Steps S107 and S109, two lanes including a first lane L1 and a second lane L2 out of three lanes (a first lane L1, a second lane L2, and a third lane L3) of a road on which the host vehicle M is traveling are identified as a lane candidate EL2, and the mode change processor 152 determines whether a level-down event occurs in a section of a predetermined distance D in front of the host vehicle M in the travel direction for each of the first lane L1 and the second lane L2. In this example, in the section of the predetermined distance D, the second lane L2 is a straight lane and no level-down event occurs. On the other hand, the first lane L1 is a lane connected to a branching lane L4 (the first lane L1 is a lane neighboring the branching lane L4) and a level-down event occurs. That is, in the section of the predetermined distance D, a level-down event occurs in another lane (the branching lane L4) connected to the first lane L1. In this case, the mode change processor 152 determines that a level-down event occurs for the lane candidate EL2.

Figure 7:
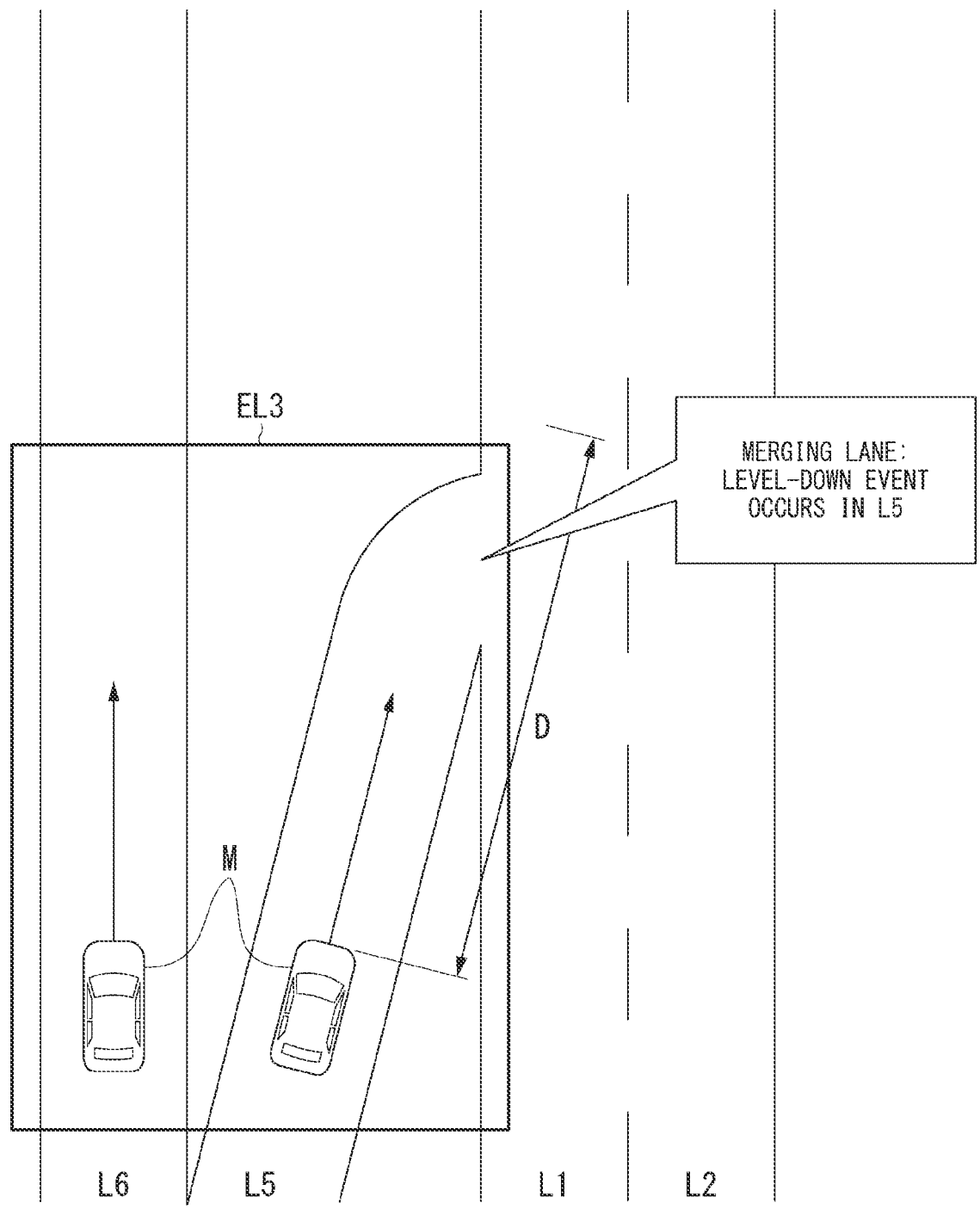
FIG. 7 is a diagram showing another example of a situation in which a level-down event occurs in a lane candidate.

FIG. 7 is a diagram showing another example of a situation in which a level-down event occurs in a lane candidate. In the example shown in FIG. 7, in Steps S107 and S109, two lanes including a fifth lane L5 and a sixth lane L6 are identified as a lane candidate EL3, and the mode change processor 152 determines whether a level-down event occurs in a section of a predetermined distance D in front of the host vehicle M in the travel direction for each of the fifth lane L5 and the sixth lane L6. In this example, in the section of the predetermined distance D, the sixth lane L6 is a straight lane and no level-down event occurs. On the other hand, the fifth lane L5 is a merging lane and a level-down event occurs. In this case, the mode change processor 152 determines that a level-down event occurs for the lane candidate EL3.

The mode change processor 152 determines whether a level-down event occurs on the basis of information of a level-down event stored in correlation with each lane in the recommended lane map information. That is, the mode change processor 152 determines whether an event occurs on the basis of the map information. The mode change processor 152 may determine whether a level-down event occurs on the basis of a surroundings image output from the camera 10. For example, when a branching lane, a merging lane, or a roadwork site appears in the surroundings image, the mode change processor 152 may determine that a level-down event occurs.

Referring back to FIG. 4, when the mode change processor 152 determines that a level-down event does not occur (Step S111: NO), it is considered that automated driving can be stably maintained. In this case, the mode change processor 152 maintains the current control level and maintains the current driving mode (mode A or mode B herein) (Step S113). In the example shown in FIG. 6, when the distance between the current position of the host vehicle M in the first lane L1 and a branching point to the branching lane L4 is greater than the predetermined distance D, the mode change processor 152 determines that a level-down event does not occur for the lane candidate EL2 and maintains the current control level. That is, the mode change processor 152 maintains the current control level when the distance between the current position of the host vehicle and an occurrence position of an event in the lane candidate is greater than a predetermined value.

On the other hand, when it is determined that a level-down event occurs (Step S111: YES), the mode change processor 152 changes the driving mode of automated driving to a driving mode with a lower control level (Step S115). For example, when the driving mode of the host vehicle M is mode A or mode B, the mode change processor 152 changes the driving mode to mode C, mode D, or mode E with a lower control level than mode B. In other words, when the driving mode of the host vehicle M is mode A or mode B, the mode change processor 152 changes the driving mode to mode C, mode D, or mode E with a heavier responsibility (task) to be imposed on an occupant than mode B. When the control level is lowered, the mode change processor 152 causes the HMI 30 (output device) to output information for requesting a driving operation for an occupant of the vehicle.

That is, when an event occurs in at least one lane of the lane candidates or when an event occurs in another lane connected to at least one lane of the lane candidates, the mode change processor 152 lowers the control level.

When a level-down event occurs in another lane (the branching lane L4) connected to a lane (the first lane L1) identified as a lane candidate in which the host vehicle M is traveling as shown in FIG. 6B, the mode change processor 152 may cause a display device included in the HMI 30 to display a screen for selecting whether a level-down event occurs (that is, whether the host vehicle is to enter the branching lane L4) and change the driving mode of automated driving on the basis of a selection operation of an occupant on the selection screen. When the selection screen receives an operation indicating that a level-down event (that is, the vehicle enters the branching lane L4) occurs from an occupant, the mode change processor 152 may change the driving mode of automated driving to a driving mode with a lower control level and request the occupant to grasp the steering wheel. On the other hand, when the selection screen receives an operation indicating that a level-down event does not occur (that is, the vehicle does not enter the branching lane L4 and goes straight in the first lane L1) from the occupant (that is, when it is requested to maintain automated driving), the mode change processor 152 may maintain the current control level. When an operation from an occupant cannot be detected in the selection screen (when the occupant performs no operation), the mode change processor 152 may change the driving mode of automated driving to a driving mode with a lower control level and request the occupant to grasp the steering wheel.

Similarly, when the lane candidate determiner 155 determines that a lane candidate is not able to be identified (Step S109: NO), the mode change processor 152 changes the driving mode of automated driving to a driving mode with a lower control level (Step S115).

When the position of the vehicle identified by the host vehicle position information (reference information) is not determined, the mode change processor 152 stops the automated driving. For example, when the position of the vehicle identified by the host vehicle position information does not exist in a lane or when the position of the vehicle identified by the host vehicle position information moves a predetermined distance or more within a unit time, the mode change processor 152 stops the automated driving. The case in which the position of the vehicle moves a predetermined distance or more within a unit time indicates, for example, a case in which movement which cannot be realized for a short time in view of performance of the host vehicle M (for example, movement in the vehicle width direction of the host vehicle M) is performed such as a case in which the position of the host vehicle M is located in a left-end lane at a certain time and moves to a right-end lane separated a predetermined distance or more from the left-end lane at a next time.

As described above, mode A and mode B are modes in which a task of grasping the steering wheel 82 is not imposed as a duty on an occupant. On the other hand, mode C, mode D, and mode E are modes in which the task of grasping the steering wheel 82 is imposed as a duty on the occupant. Accordingly, when it is determined that a level-down event occurs or when it is determined that a lane candidate is not able to be identified, the mode change processor 152 changes the driving mode of the host vehicle M to a mode in which a task of grasping the steering wheel 82 is imposed as a duty on the occupant. Accordingly, the routine of the flowchart ends.

[Lane Candidate Determining Process]

Figure 8A:
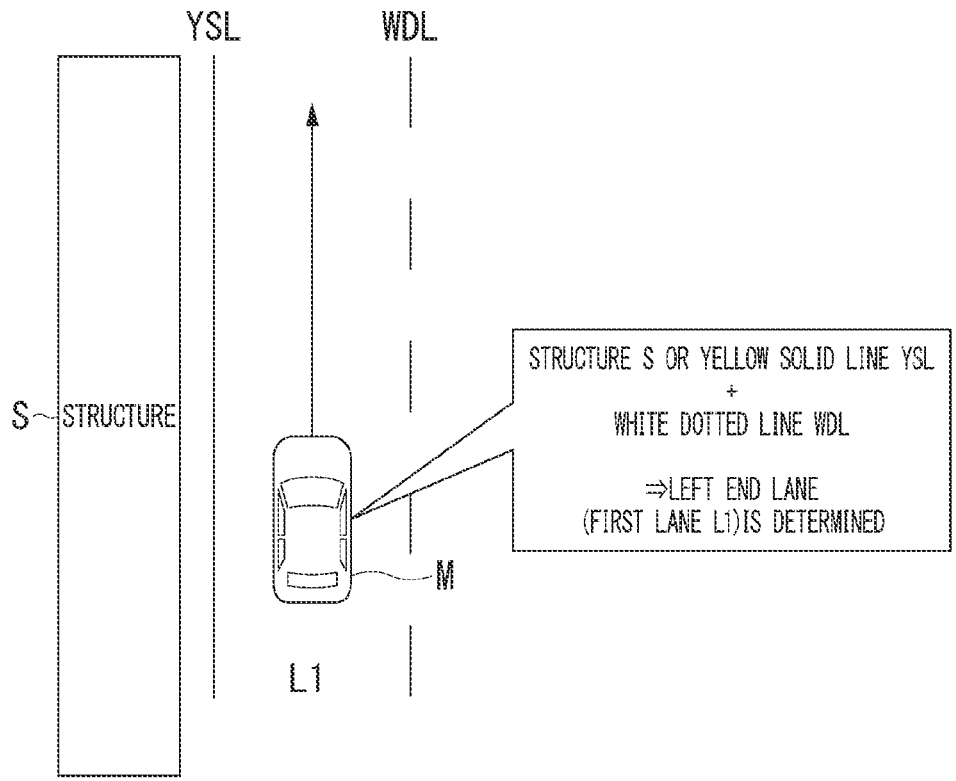
FIG. 8A is a diagram showing an example of a lane candidate determining process which is performed by a lane candidate determiner according to the embodiment.
Figure 8B:
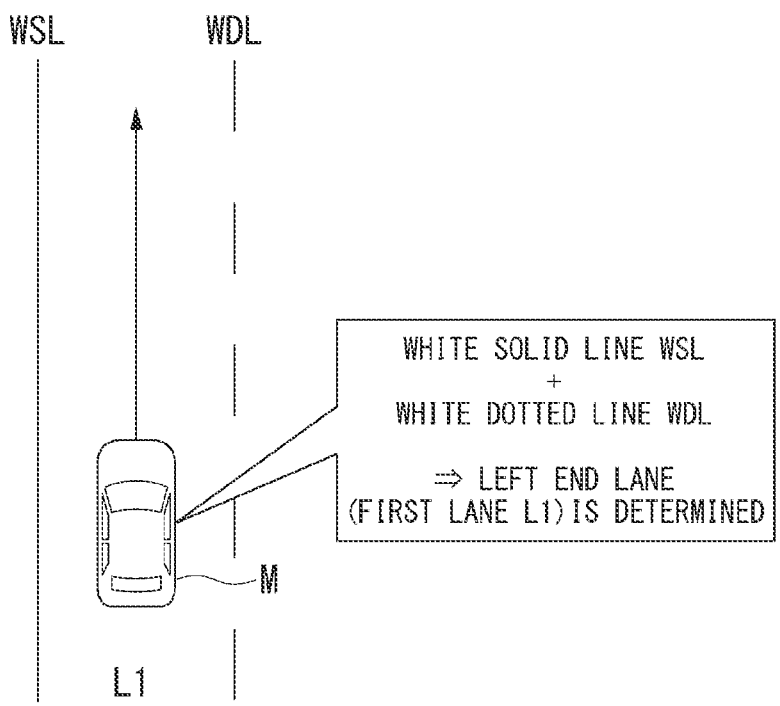
FIG. 8B is a diagram showing an example of a lane candidate determining process which is performed by the lane candidate determiner according to the embodiment.
Figure 9:
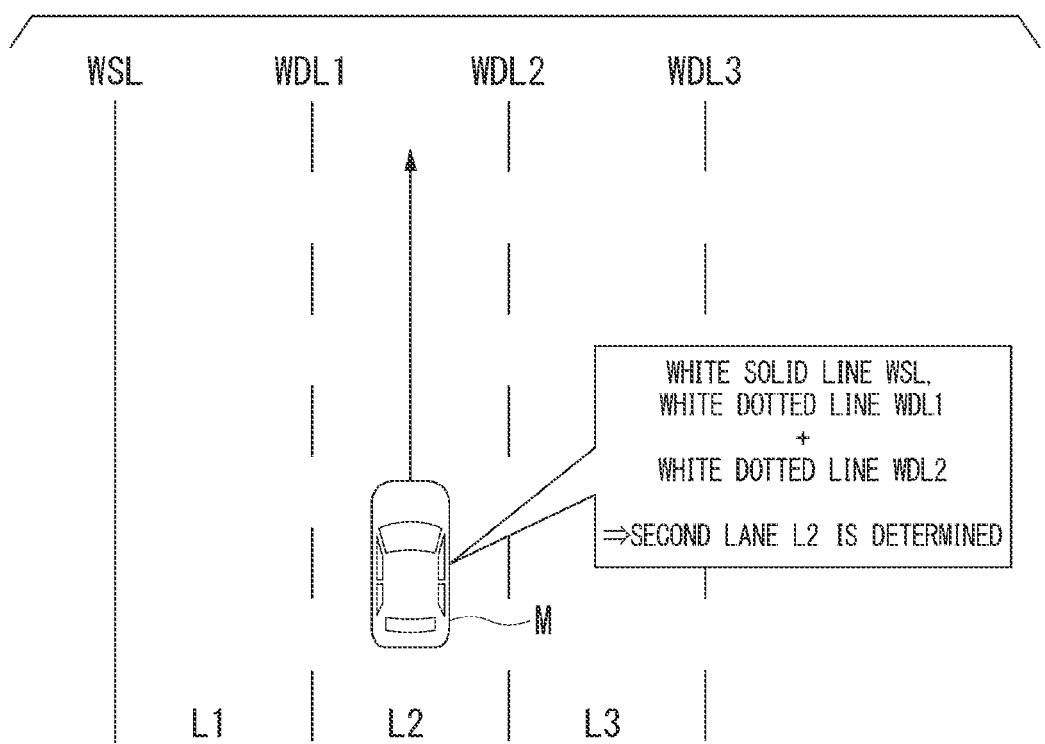
FIG. 9 is a diagram showing an example of a lane candidate determining process which is performed by the lane candidate determiner according to the embodiment.

Details of the lane candidate determining process which is performed by the lane candidate determiner 155 will be described below. The lane candidate determiner 155 determines lane candidates, for example, on the basis of recommended lane map information and surroundings image acquired by the acquirer 153. FIGS. 8A, 8B, and 9 are diagrams showing examples of the lane candidate determining process which is performed by the lane candidate determiner 155 according to the embodiment. In these examples, lane candidates for the host vehicle M are estimated on the basis of information of road boundary lines or an object appearing in the surroundings image output from the camera 10.

In the example shown in FIG. 8A, the lane candidate determiner 155 recognizes a road boundary line of a yellow solid line (a yellow solid line YSL) or an object S which is located on the left in the travel direction of the host vehicle M and a road boundary line of a white dotted line (a white dotted line WDL) which is located on the right in the travel direction of the host vehicle M on the basis of the surroundings image. In this case, the lane candidate determiner 155 identifies the left-end lane (the first lane L1) of the road as a lane candidate. For example, the lane candidate determiner 155 identifies the lane candidate by comparing a pattern of road boundary lines (type information) near the host vehicle M recognized from the surroundings image captured by the camera 10 with a pattern of road boundary lines (type information) acquired from the recommended lane map information. The lane candidate determiner 155 identifies the lane candidate by comparing information of an object S recognized from the surroundings image with information of an object acquired from the recommended lane map information. Examples of the object S include travel road boundaries (road boundaries) including a signal, a road marking, a road edge, a curbstone, a median strip, and a guard rail. The lane candidate determiner 155 may determine the lane candidate on the basis of position information of a nearby object output from the radar device 12, distance information to a nearby object output from the LIDAR 14, and recognition information such as a position, a type, and a speed of a nearby object output from the object recognition device 16 in addition to the surroundings image.

In the example shown in FIG. 8B, the lane candidate determiner 155 recognizes a road boundary line of a white solid line (a white solid line WSL) which is located on the left in the travel direction of the host vehicle M and a road boundary line of a white dotted line (a white dotted line WDL) which is located on the right in the travel direction of the host vehicle M on the basis of the surroundings image. In this case, the lane candidate determiner 155 identifies the left-end lane (the first lane L1) of the road as a lane candidate.

In the example shown in FIG. 9, the lane candidate determiner 155 recognizes a road boundary line of a white dotted line (a white dotted line WDL1) and a road boundary line of a white solid line (a white solid line WSL) which are sequentially located from the closest to the host vehicle M on the left in the travel direction of the host vehicle M and a road boundary line of a white dotted line (a white dotted line WDL2) which is located on the right in the travel direction of the host vehicle M on the basis of the surroundings image. In this case, the lane candidate determiner 155 identifies the second lane L2 which is a second lane from the left end of the road as a lane candidate.

That is, the lane candidate determiner 155 identifies a lane candidate on the basis of type information of a road boundary line included in the surroundings image information or information of an object capable of identifying a lane position.

According to the aforementioned embodiment, the vehicle control device includes an acquirer (for example, the acquirer 153) configured to acquire map information (for example, recommended lane map information) including information of lanes and reference information (for example, host vehicle position information) for identifying a position of a host vehicle M; a lane determiner (for example, the lane determiner 154) configured to determine a travel lane in which the host vehicle M is traveling in the map information based on the acquired reference information; a lane candidate determiner (for example, the lane candidate determiner 155) configured to determine lane candidates in which the host vehicle M is traveling in the map information based on the reference information when the travel lane has not been identified by the lane determiner; and a change processing unit (for example, the mode change processor 152) configured to maintain a current control level of the automated driving when an event in which the control level needs to be changed does not occur in any one of the lane candidates and to lower the control level when the event occurs in at least one of the lane candidates. Accordingly, it is possible to change the control level of automated driving according to appropriate conditions.

The above-mentioned embodiment can be expressed as follows:

a vehicle control device that controls automated driving of a vehicle, the vehicle control device including:
a storage device that stores a program; and
a hardware processor,
wherein the hardware processor is configured to execute the program stored in the storage device to:
acquire map information including information of lanes and reference information for identifying a position of the vehicle;
determine a travel lane in which the vehicle is traveling in the map information based on the acquired reference information;
determine lane candidates in which the vehicle is traveling in the map information based on the reference information when the travel lane has not been identified; and
maintain a current control level of the automated driving when an event in which the control level needs to be changed does not occur in any one of the lane candidates and lower the control level when the event occurs in at least one of the lane candidates.

While an embodiment of the present invention has been described above, the present invention is not limited to the embodiment and can be embodied in various modifications and replacements without departing from the gist of the present invention.

What is claimed is:

1. A vehicle control device that controls automated driving of a vehicle, the vehicle control device comprising a processor configured to execute a program to:
acquire map information including information of a plurality of lanes and reference information for identifying a position of the vehicle;
determine whether or not a travel lane in which the vehicle is currently traveling in the map information is identified based on the acquired reference information, the travel lane being one of the plurality of lanes;
when determining that the travel lane is identified, maintain a current control level of the automated driving;
when determining that the travel lane is not identified,
determine lane candidates in which the vehicle is likely to be traveling in the map information based on the reference information when the travel lane has not been identified, the lane candidates being determined from the plurality of lanes;
determine whether or not an event in which a control level of the automated driving needs to be changed occurs for each of the lane candidates in a section of a predetermined distance in front of the vehicle in a travel direction based on the map information;
maintain the current control level of the automated driving when determining that the event does not occur in any one of the lane candidates;
determine that the event in which the control level needs to be changed occurs for the lane candidates and lower the control level when determining that the event occurs in at least one of the lane candidates; and
maintain the current control level of the automated driving when a distance between a current position of the vehicle in the lane candidates for which it is determined that the event occurs and an occurrence position of the event is equal to or greater than a predetermined value.

2. The vehicle control device according to claim 1, wherein the reference information is positioning information of the vehicle based on radio waves transmitted from artificial satellites.

3. The vehicle control device according to claim 1, wherein the processor executes the program to lower the control level when the event occurs in at least one lane of the lane candidates or when the event occurs in another lane connected to the at least one lane of the lane candidates.

4. The vehicle control device according to claim 1, wherein the processor executes the program to cause an output device to output information for requesting a driving operation for an occupant of the vehicle when the control level is lowered.

5. The vehicle control device according to claim 1, wherein the processor executes the program to identify the lane candidates out of the plurality of lanes in which the vehicle is likely to be traveling based on at least one of surroundings image information acquired by imaging surroundings of the vehicle, positioning information of the vehicle based on radio waves transmitted from artificial satellites, and positioning information based on dead-reckoning navigation.

6. The vehicle control device according to claim 5, wherein the processor executes the program to identify the lane candidates based on type information of road boundary lines included in the surroundings image information or information of objects enabling lane positions to be identified.

7. The vehicle control device according to claim 1, wherein the processor executes the program to stop the automated driving when the position of the vehicle identified by the reference information is not present in a lane or when the position of the vehicle identified by the reference information moves a predetermined distance or more within a unit time.

8. A vehicle control method that is performed by a computer mounted in a vehicle to control automated driving of the vehicle, the vehicle control method comprising:
acquiring map information including information of a plurality of lanes and reference information for identifying a position of the vehicle;
determining whether or not a travel lane in which the vehicle is currently traveling in the map information is identified based on the acquired reference information, the travel lane being one of the plurality of lanes;
when determining that the travel lane is identified, maintaining a current control level of the automated driving;
when determining that the travel lane is not identified,
determining lane candidates in which the vehicle is likely to be traveling in the map information based on the reference information when the travel lane has not been identified, the lane candidates being determined from the plurality of lanes;
determining whether or not an event in which a control level of the automated driving needs to be changed occurs for each of the lane candidates in a section of a predetermined distance in front of the vehicle in a travel direction based on the map information;
maintaining the current control level of the automated driving when determining that the event does not occur in any one of the lane candidates;
determining that the event in which the control level needs to be changed occurs for the lane candidates and lowering the control level when determining that the event occurs in at least one of the lane candidates; and maintaining the current control level of the automated driving when a distance between a current position of the vehicle in the lane candidates for which it is determined that the event occurs and an occurrence position of the event is equal to or greater than a predetermined value.

9. A non-transitory computer-readable storage medium storing a program causing a computer, which is mounted in a vehicle to control automated driving of the vehicle, to perform:

acquiring map information including information of a plurality of lanes and reference information for identifying a position of the vehicle;

determining whether or not a travel lane in which the vehicle is currently traveling in the map information is identified based on the acquired reference information, the travel lane being one of the plurality of lanes;

when determining that the travel lane is identified, maintaining a current control level of the automated driving;

when determining that the travel lane is not identified, determining lane candidates in which the vehicle is likely to be traveling in the map information based on the reference information when the travel lane has not been identified, the lane candidates being determined from the plurality of lanes;

determining whether or not an event in which a control level of the automated driving needs to be changed occurs for each of the lane candidates in a section of a predetermined distance in front of the vehicle in a travel direction based on the map information;

maintaining the current control level of the automated driving when determining that the event does not occur in any one of the lane candidates;

determining that the event in which the control level needs to be changed occurs for the lane candidates and lowering the control level when determining that the event occurs in at least one of the lane candidates; and maintaining the current control level of the automated driving when a distance between a current position of the vehicle in the lane candidates for which it is determined that the event occurs and an occurrence position of the event is equal to or greater than a predetermined value.

\* \* \* \* \*